(12) United States Patent
Porter et al.

(10) Patent No.: US 7,787,531 B2
(45) Date of Patent: *Aug. 31, 2010

(54) PREDISTORTING OF CONTENTION SIGNALS

(75) Inventors: John David Porter, Gt. Shelford (GB); Malcolm Paul Sellars, Ely (GB); Stephen David Greaves, Cambridge (GB)

(73) Assignee: Cambridge Broadband Networks Limited (GB)

( * ) Notice: Subject to any disclaimer, the term of this patent is extended or adjusted under 35 U.S.C. 154(b) by 1678 days.

This patent is subject to a terminal disclaimer.

(21) Appl. No.: 10/484,557

(22) PCT Filed: Jul. 18, 2002

(86) PCT No.: PCT/GB02/03303

§ 371 (c)(1), (2), (4) Date: Jun. 18, 2004

(87) PCT Pub. No.: WO03/013087

PCT Pub. Date: Feb. 13, 2003

(65) Prior Publication Data

US 2004/0233981 A1  Nov. 25, 2004

(30) Foreign Application Priority Data

Jul. 26, 2001 (GB) ................................ 0118288.0
Jan. 25, 2002 (GB) ................................ 0201738.2

(51) Int. Cl.
*H03H 7/30* (2006.01)

(52) U.S. Cl. ............... 375/229; 375/232; 455/63.1; 455/114.3; 370/338; 370/447; 370/390

(58) Field of Classification Search ............... 375/229, 375/296, 142, 143, 149, 150, 152, 233–232, 375/341, 343, 358, 356, 365, 366, 230, 231; 455/63.1, 67.13, 65, 114.3; 370/447, 338, 370/390

See application file for complete search history.

(56) References Cited

U.S. PATENT DOCUMENTS 4,995,057 A  2/1991  Chung (Continued)

FOREIGN PATENT DOCUMENTS

EP  0 936 781  8/1999

(Continued)

OTHER PUBLICATIONS

Xiang-Gen Xia, "New precoding for intersymbol interference cancellation using nonmaximally decimated multirate filterbanks with ideal FIR equalizers", Oct. 1997, IEEE transaction on signal processing, vol. 45 No. 10, pp. 2431-2441.*

(Continued)

*Primary Examiner*—David C Payne
*Assistant Examiner*—Rahel Guarino
(74) *Attorney, Agent, or Firm*—Fish & Richardson P.C.

(57) ABSTRACT

In a fixed wireless access (FWA) communications system comprising an Access Point (501) and a plurality of Subscriber Units (502-1, 502-2 502-N) each Subscriber Unit transmits a concentration word when it wishes to obtain access to transmit data. Each Subscriber Unit (502) includes a linear precoder (517) which predistorts the contention word to compensate for the impulse response of the transmission channel between it and Access Point (501). The precoder (517) is optimized specifically for the contention word to be transmitted instead of for general data.

32 Claims, 12 Drawing Sheets

U.S. PATENT DOCUMENTS

| | | | | |
|---|---|---|---|---|
| 5,345,342 | A | * | 9/1994 | Abbott et al. .................. 360/48 |
| 5,388,124 | A | * | 2/1995 | Laroia et al. ................. 375/286 |
| 5,881,363 | A | | 3/1999 | Ghosh et al. |
| 6,314,135 | B1 | * | 11/2001 | Schneider et al. ........... 375/232 |
| 6,560,209 | B1 | * | 5/2003 | Alamouti et al. ............ 370/330 |
| 6,792,049 | B1 | * | 9/2004 | Bao et al. .................... 375/285 |
| 7,050,513 | B1 | * | 5/2006 | Yakhnich .................... 375/341 |
| 7,155,165 | B1 | | 12/2006 | Kowalewki |
| 7,197,084 | B2 | | 3/2007 | Ketchum et al. |

FOREIGN PATENT DOCUMENTS

| | | |
|---|---|---|
| EP | 1 063 784 | 12/2000 |
| GB | 2 262 866 | 6/1993 |
| GB | 2 347 054 | 8/2000 |
| GB | 2 373 420 | 9/2002 |
| GB | 2 376 381 A | 12/2002 |
| GB | 2 376 391 A | 12/2002 |
| GB | 2 378 103 | 1/2003 |
| GB | 2 384 666 A | 7/2003 |
| GB | 2 396 277 A | 6/2004 |
| WO | WO 00/51260 | 8/2000 |
| WO | WO 03/013087 A2 | 2/2003 |

OTHER PUBLICATIONS

Leung, C-S, et al., "A Pruning Method for the Recursive Least Squared Algorithm", *Neural Networks*, 14(2):147-174 (2001).

Sellers, M., et al., "Stabilized Precoder with Antenna Diversity for Wireless LANs", *IEEE Transactions on Consumer Electronics*, 45(4):1169-1175 (1999).

M.P. Sellars et al., "Word-specific precoding of contention bursts for broadband wireless networks," *Electronics Letters*, Apr. 3, 2003, vol. 39, No. 7, Copyright IEE 2003, Jan. 3, 2003, *Electronic Letters Online No. 20030409*, msellars@ieee.org, pp. 1-2.

* cited by examiner

Wireless communications network

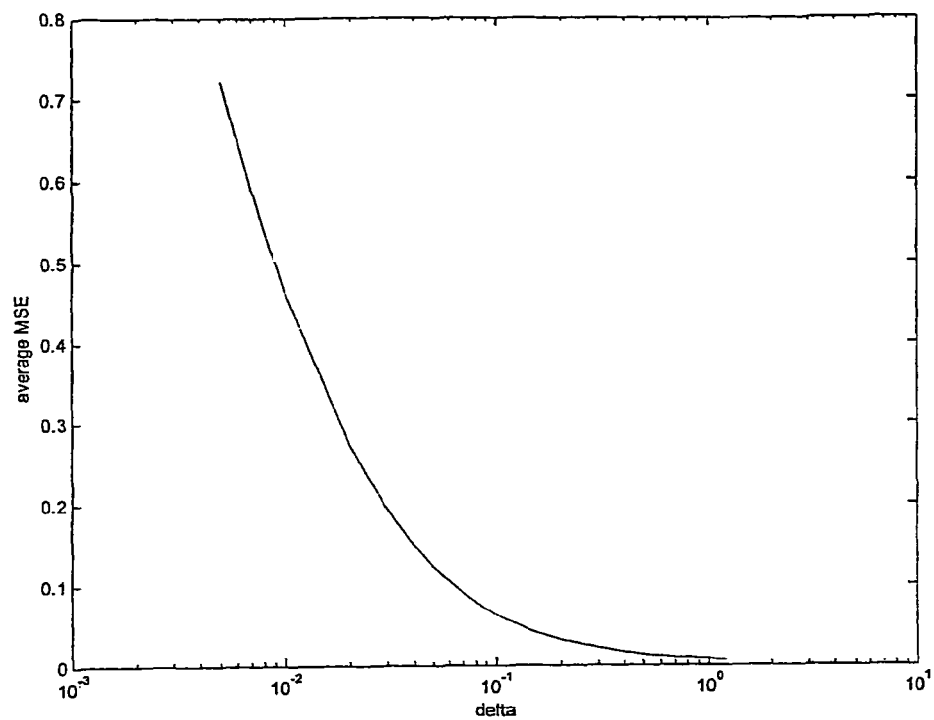
Figure 12 : Average MSE for various values of delta (δ)
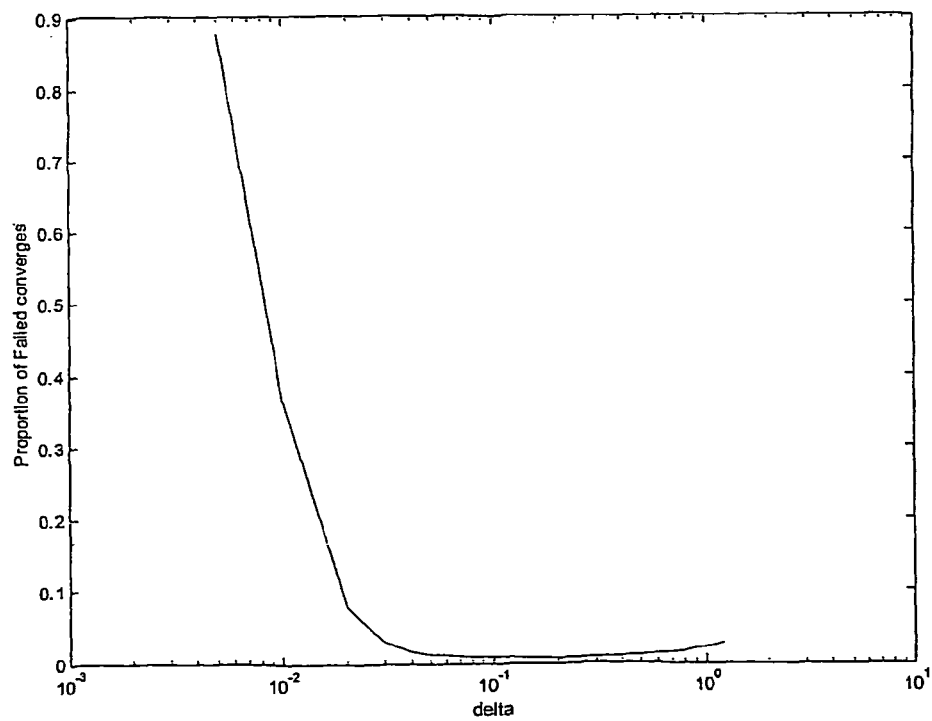
Figure 13 : Proportion of failed converges for various values of delta (δ)

PREDISTORTING OF CONTENTION SIGNALS

CROSS-REFERENCE TO RELATED APPLICATIONS

This application claims priority under 35 USC §119(b) to PCT Patent Application Ser. No. PCT/GB02/03303, filed on Jul. 18, 2002, which claims priority to UK Patent Application Ser. No. 0201738.2 filed on Jan. 25, 2002 and UK Patent Application Ser. No. 0118288.0, filed on Jul. 26, 2001, the entire contents of which are hereby incorporated by reference.

BACKGROUND AND BRIEF SUMMARY OF THE INVENTION

The invention relates to a method of predistorting data to compensate for the impulse response of a channel over which it is to be transmitted.

The invention further relates to a fixed wireless access system comprising an access point and a plurality of subscriber units. The invention still further relates to an access point and to a subscriber unit for use in such a system.

In radio communications systems, multipath interference is a major obstacle to high speed data transmission. Multipath interference arises when the radio signal is reflected and diffracted by objects in its path such as buildings, trees and even vehicles. Multipath interference causes echos from a particular data symbol to overlap with neighbouring symbols and this is known as intersymbol interference. Some form of equalisation is necessary to remove the intersymbol interference from the received signal. Unfortunately the equalisation process requires complicated signal processing and for high speed real time data communication systems this can be a significant problem.

In a fixed wireless access communications network, many subscriber units communicate with a single access point using a time division multiple access protocol. In a point to multipoint fixed wireless access system, each subscriber unit only receives data from a single access point and downlink bursts can often be heard by all subscriber units. Consequently, each subscriber unit has plenty of time to train its equaliser on the downstream channel. On the upstream channel however, signal transmissions occur between many different subscriber units and a single access point and so the access point has a very heavy equalisation burden as the channel characteristics of the different channels from the subscriber units to the access point may all be different and need different equalisation characteristics. As a result the equaliser at the access point will be required to adjust its coefficients rapidly to deal with bursts arriving from different subscriber units over channels having different impulse responses while the equaliser at each subscriber unit has the relatively simple task of equalising the single channel between itself and the access point. This is particularly significant when a frequency division duplex system is employed as there is no correlation between the upstream and downstream channels. During normal data transmission upstream data slots are scheduled by the access point which then knows the identity of the subscriber unit which is to transmit and therefore has prior knowledge of the impulse response of the channel between the scheduled subscriber unit and the access point. It is possible to use this prior knowledge to initialise the equaliser coefficients at the access point using a look up table so reducing training time and improving efficiency, assuming that the channel impulse response is unchanging or changes only slowly.

In order to obtain transmission time, each subscriber unit must first contend for channel access. This is achieved by transmitting a unique subscriber unit identifier, called a contention word, to the access point during a known contention field. The access point decodes the subscriber unit identifier and allocates a field in a subsequent data frame to that subscriber unit for upstream data transmission. The contention word transmitted from the subscriber unit is distorted by multipath interference due to reflection and diffraction in the radio channel and since the subscriber units have different physical positions the paths between the subscriber units and the access point are different leading to the channel distortion being different for each subscriber unit. Consequently, the received contention signal must be equalised before it can be decoded. During this contention procedure, however, the access point does not know the identity of the subscriber unit which is transmitting during a particular contention slot. This means that the access point has no prior knowledge of the channel impulse response and so the access point must retrain its equaliser for each contention burst. This retraining introduces delays, requires increased transmission overhead for an equaliser training sequence, and requires high computational complexity at the access point.

It is known that a precoder can be used to invert the impulse response of a communications channel, also known as the channel impulse response. The precoder predistorts the data signal using the inverse of the channel response so that the received signal (after passing through the channel) is free from distortion. One possibility is to use a linear finite impulse response (FIR) filter resulting in a linear precoder. The problem with a linear precoder is that any roots of the channel impulse response lying close to the unit circle will result in a very long FIR filter which may not be practically realisable. It is also possible to construct a precoder using a feedback or infinite impulse response (IIR) filter to invert the channel response. The problem with using an IIR filter is that the precoder is prone to instability.

A contention scheme disclosed in our copending UK Patent Application No: 0106604.2 (42559) relies on full precoding of the contention word at the subscriber unit and has the capability of removing a small number of critical zeros from the channel impulse response. It uses a linear precoder to cancel all roots of the channel impulse response except for those roots lying on the unit circle in the z plane. A root rotation method combined with pulse position modulation is used to remove critical zeros (zeros on the unit circle) from the channel response. In effect the input data word is modified to cancel out those zeros of the channel impulse response which the precoder is unable to cancel. The problem with this method is that some radio channels contain multiple critical zeros which are beyond the capacity of the root rotation method to remove.

The invention provides a fixed wireless access communications system comprising an access point and a plurality of subscriber units each transmitting a predetermined data sequence; in which each subscriber unit comprises a precoder for predistorting the predetermined data sequence to compensate for the characteristics of the upstream transmission channel between the subscriber unit and the access point wherein the system comprises means for optimising the precoder characteristic specifically for the predetermined data sequence.

Such an optimised preceding scheme is suited to the contention process in a fixed wireless access communication system where each subscriber unit wishes to transmit a short predetermined sequence known as a contention word during the contention slot. Typically, each subscriber unit only needs to transmit a single fixed sequence for contention rather than a number of arbitrary data sequences. Consequently, it is possible to optimise the precoder specifically for this sequence. This gives the advantage that the contention word can usually be ideally precoded before transmission either by using a short precoder or by storing the predistorted predetermined data sequence at the transmitter. A further advantage is that a linear precoder can be used avoiding the stability problems associated with non-linear precoders. Optimising the precoder for a unique data sequence allows more degrees of freedom for the precoder coefficients, so that a linear precoder can be selected that avoids roots lying near the unit circle in the z-plane. In a conventional linear precoder roots lying close to the unit circle in the z-plane result in a very long precoder. In addition, the length of the precoder is minimised which prevents excessive smearing of the received contention word in time, so minimising transmission overheads. In the second embodiment only a small memory capacity is required to store the predistorted contention word.

The precoder may be optimised using the recursive least squares algorithm. When using this algorithm the initial state of the signal correlation matrix $P_0$ may be set to $P_0 = \delta I$, where $\delta > 0.1\sigma^2$ and $\sigma^2$ is the variance of the data samples, and where I is the identity matrix. The number of iterations may be restricted to be not substantially greater than the length of the precoder. The length of the precoder may be made equal to the length of the predetermined data sequence.

This gives the advantage that by using a relatively small number of iterations the computational complexity and processing time are minimised while the preceding obtained is optimised for the actual data sequence being transmitted by setting the initial parameters using a knowledge of the sequence to be received and decoded.

Generally the recursive least squares (RLS) algorithm used to train an equaliser employs a large number of iterations and sets the value of $\delta$ to a very much lower value, typically $<0.001\sigma^2$. This ensures that the initial conditions do not significantly affect the tap coefficients produced and the equaliser or the precoder is trained for all data sequences. When the constraints given above are applied to the RLS algorithm the initial conditions do affect the tap co-efficients and the precoder is optimised specifically for the predetermined sequence.

Clearly alternative algorithms for obtaining precoder (or equaliser) tap coefficients could be used to implement the invention provided that they are constrained to optimise the precoder for the specific data sequence. Examples of alternative algorithms which could be used include gradient search methods.

A frequency division duplex, time division multiplex protocol may be used for communication between the access point and the subscriber units.

Precoding of transmissions from subscriber units is particularly advantageous in such systems as the characteristics of the upstream channels between the subscriber units and the access point are not correlated with those of the downstream channels between the access point and the subscriber units. This increases the processing load at the access point as each transmission from the subscriber units has to be equalised if preceding is not used and during contention the access point has no prior knowledge of the upstream channel characteristics as it does not know which subscriber unit is transmitting until it has decoded the contention word.

The invention further provides a method of pre-distorting a predetermined data sequence to compensate for the impulse response of a channel over which the predetermined data sequence is to be transmitted comprising the steps of;

transmitting the predetermined data sequence without precoding over the channel using a first transmitter, receiving the predetermined data sequence using a first receiver comprising an equaliser and equalising the received signal, using an algorithm that is constrained to optimise the equaliser specifically for the predetermined sequence, to enable the sequence to be decoded;

determining the equaliser coefficients required to enable the equaliser to equalise the received data sequence, applying the determined equaliser coefficients to a second transmitter;

transmitting the equaliser coefficients to a second receiver using the second transmitter, receiving the equaliser coefficients at the second receiver, and loading the received equaliser coefficients into a precoder in the first transmitter when the predetermined sequence is subsequently transmitted so that it is received at the first receiver in a form suitable for decoding without equalisation at the first receiver.

The method may be modified by replacing the loading step by the steps of forming the predistorted predetermined data sequence and storing it in memory, and subsequently transmitting the stored predetermined data sequence so that it is received at the first receiver in a form suitable for decoding without equalisation at the first receiver.

By constraining the algorithm to optimise the equaliser for the predetermined sequence a linear equaliser of relatively short length can be used to enable the data sequence to be decoded and the precoder, which takes a similar form to the equaliser, is also of short length minimising smearing of the transmitted data sequence. Also, particularly when using the modified RLS algorithm to calculate the equaliser tap coefficients a relatively low computational complexity is involved and the reduced number of iterations result in a short processing time.

The first receiver and second transmitter may be located in the access point and the second receiver and first transmitter may be located in a subscriber unit wherein in order to set up the precoder to precode the contention word the following steps are implemented;

the access point is arranged to transmit a data field comprising a subscriber unit identifier, a test contention request control code, a contention word to be returned by the subscriber unit, and a test contention delay which indicates a reserved time slot during which the subscriber unit should transmit the test contention word, the subscriber unit is arranged to receive and decode the transmitted data field and to transmit the received contention word without precoding to the access point in the reserved time slot, the access point is arranged to receive the contention word, to train a linear equaliser using the received contention word, and to determined the equaliser tap coefficients, the access point is arranged to transmit to the subscriber unit a data field comprising the subscriber unit identifier, the determined equaliser tap coefficients, and a flag indicating that the test contention word has been successfully decoded, and the subscriber unit is arranged to apply the received tap coefficients to a linear precoder to predistort the contention word on subsequent transmission of the contention word to the access point.

Alternatively the subscriber unit may be arranged to calculate and store a predistorted version of the contention word for subsequent transmission of the contention word to the access point.

The first contention word transmitted by the subscriber unit is a test contention word that is not precoded and is transmitted in a reserved contention slot, that is reserved for the specific subscriber unit. This first contention word is used to determine the precoder coefficients using an equaliser at the access point that has the same structure as the precoder at the subscriber unit. All subsequent contention words are precoded before transmission and transmitted during a non-exclusive contention slot that is also used by other subscriber units for contention.

This allows, in a system according to the invention, for the contention word to be allocated to a subscriber unit by the access point, for the precoder tap coefficients to be calculated at the access point and transmitted to the subscriber unit and for the subscriber unit to subsequently precode the contention word whenever it wishes to contend for access to a transmission slot between itself and the access point.

The invention still further provides an access point for use in a system according to the invention, the access point comprising a linear equaliser for equalising a predetermined data sequence received over a transmission channel, wherein the equaliser is optimised specifically to equalise the predetermined data sequence.

The access point may comprise a control unit for implementing the algorithm used to train the equaliser and determining the equaliser tap coefficients and a transmitter for transmitting the determined equaliser tap coefficients to the subscriber unit that transmitted the predetermined data sequence to the access point. The predetermined data sequence may be a contention word, wherein the control unit is arranged to allocate a contention word to be transmitted by a subscriber unit, to cause the allocated contention word to be transmitted to a selected subscriber unit together with an instruction to the subscriber unit to transmit the allocated contention word without preceding at a given time, and to train the equaliser using the received contention word at the given time.

The invention yet further provides a subscriber unit for use in a system according to the invention, the subscriber unit comprising a transmitter for transmitting a predetermined data sequence over a transmission channel and a precoder for preceding the predetermined data sequence to compensate for the impulse response of the transmission channel, wherein the precoder is optimised specifically to precode the predetermined data sequence.

The precoder may be a linear finite impulse response filter. Alternatively the precoder may comprise a memory in which a predistorted version of the predetermined data sequence is stored.

The subscriber unit may comprise a receiver for receiving data transmissions from an access point, a decoder for decoding the received data transmissions, a control unit for interpreting the data transmissions from the access point and controlling the response thereto of the subscriber unit, and a transmitter for transmitting data sequences to the access point; wherein the control unit is arranged to cause the subscriber unit to transmit a received contention word to the access point in response to an instruction received from the access point without precoding at a time specified by the access point and to apply preceding to the contention word on transmissions of the contention word subsequent to receiving precoder tap coefficients from the access point.

BRIEF DESCRIPTION OF THE DRAWINGS

The above and other features and advantages of the invention will be apparent from the following description, by way of example, of embodiments of the invention with reference to the accompanying drawings, in which;

FIG. 12 is a graph showing the variation of the average mean squared error and the value of $\delta$;

FIG. 13 is a graph showing the value of $\delta$ plotted against the proportion of failed convergences.

DETAILED DESCRIPTION OF THE INVENTION

Figure 1:
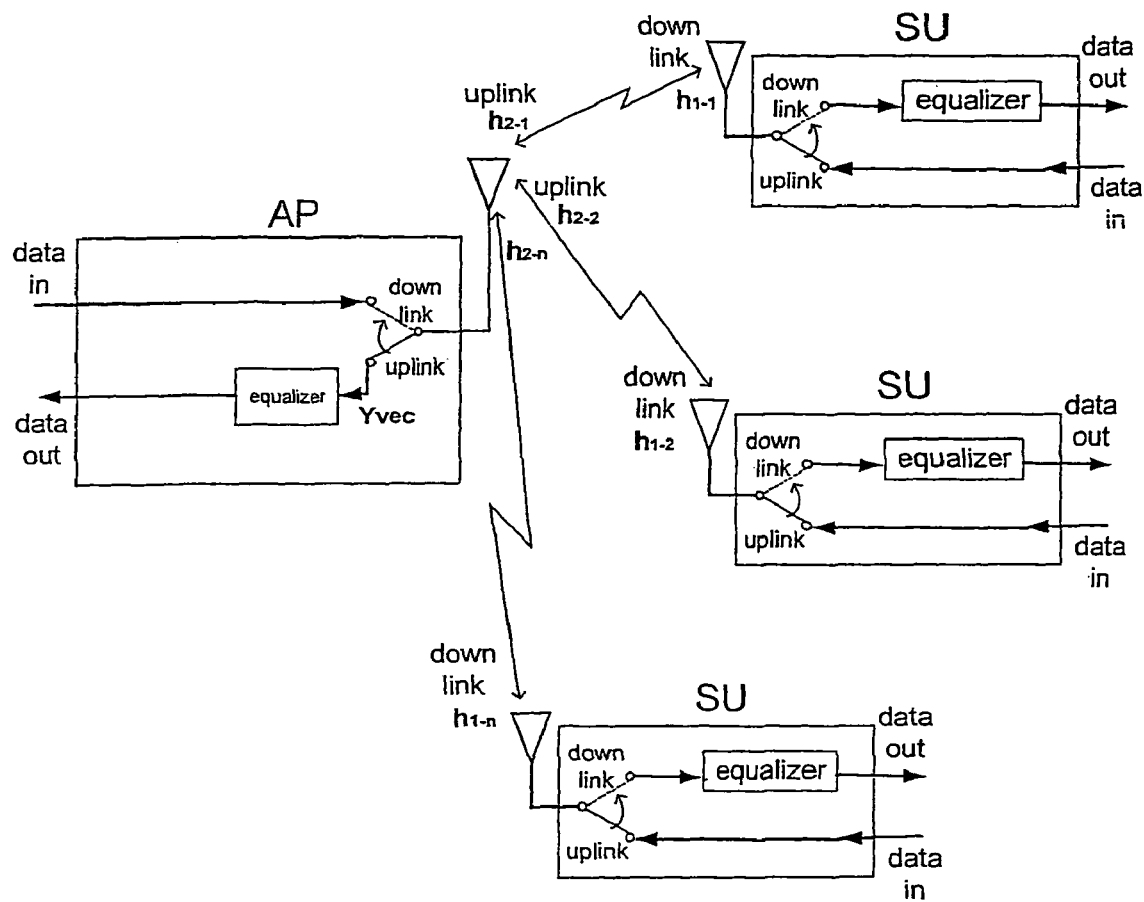
FIG. 1 shows in block schematic form a generalised fixed wireless access communications system of known form.

As shown in FIG. 1 a known fixed wireless access communications network comprises an access point 1 and a plurality of subscriber units 2-1, 2-2 to 2-N. Each subscriber unit is connected to the access point via a downstream channel channel $h_{1-1}$, $h_{1-2}$ and $h_{1-N}$ upstream channels $h_{2-1}$, $h_{2-2}$ to $h_{2-N}$. As discussed in the introduction, each of these channels will suffer multipath interference and each of the channels will have its own channel impulse response. Normally the subscriber units will be able to hear all downstream transmissions from the access point and consequently will have plenty of time to train an equaliser to remove intersymbol interference. In the upstream direction, however, each subscriber unit transmits to the access point over a separate channel using a time division multiplex protocol. As a result, the characteristics of the equaliser at the access point 1 have to be changed for each transmission from the subscriber units since the channel impulse responses for the transmissions from different subscriber units will be different. During normal data transmission this may be achieved by switching equaliser coefficients stored in a look up table depending on which subscriber unit has been allocated the particular upstream transmission time slot. That is the access point knows which subscriber unit is transmitting at any particular time and can preset its equaliser characteristics using a look up table storing the appropriate tap co-efficients, which have been determine using training sequences on previous transmissions to equalise the particular channel impulse response in the channel between the expected subscriber unit and the access point. During a contention slot, however, the access point has no knowledge of which subscriber unit is attempting to communicate with it. Thus, the equaliser has to be trained for every transmission as it has no prior knowledge of which transmission channel is being used and hence what its characteristics are. This imposes a large overhead as the subscriber unit has to transmit a training sequence within the contention slot in order to enable the access point to train its equaliser.

As has been stated earlier, it is known that a precoder can be used to invert the channel impulse response before transmission. These precoders use some kind of filter or combination of filters to invert the channel impulse response so that any transmitted signal, after precoding and passing through the channel, is received undistorted at the receiver. The precoder transfer function F is the inverse of the channel transfer function H, so that FH=1. Thus any arbitrary data sequence input at the transmitter is received undistorted at the receiver. This holds true for all input sequences.

In our co-pending UK Patent Application No: 0106604.2 (42559) a linear precoder is used to avoid the stability problems associated with non-linear precoders. The linear precoder cancels all roots of the channel impulse response except for those roots lying on the unit circle in the z plane. A root rotation method combined with pulse position modulation is used to remove critical zeros (zeros on the unit circle) from the channel impulse response. In effect, the input data word is modified to cancel out those zeros of the channel impulse response which the precoder is unable to cancel. The difficulty with this method is that some channels contain multiple critical zeros which are beyond the capacity of the root rotation method to remove.

It is desirable to use pre-equalisation (preceding) for the contention word as proposed in our co-pending application, but a more robust method is desirable to deal with the situation where multiple critical zeros of the channel impulse response lie on or close to the unit circle in the z plane.

Figure 2:
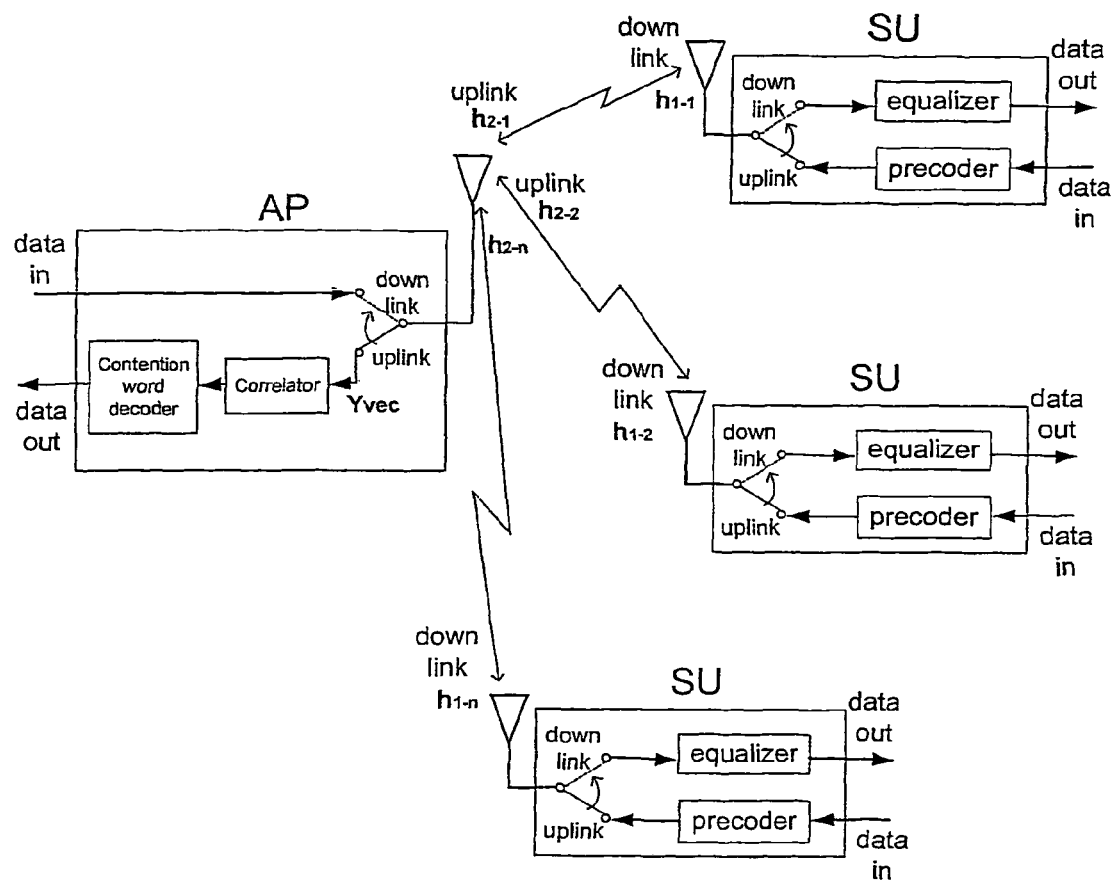
FIG. 2 shows in block schematic form a fixed wireless access system according to the invention.

FIG. 2 shows in block schematic form a fixed wireless access system in which the invention may be implemented. The system shown in FIG. 2 comprises an access point 501 and a plurality of subscriber units 502-1, 502-2 to 502-N. Transmission between the access point 501 and the subscriber units 502 is by means of a time division multiplex, frequency division duplex protocol. That is, the access point transmits data to the subscriber units at one carrier frequency and receives transmissions from each subscriber unit using a different carrier frequency, the subscriber units all transmitting at the same carrier frequency, but in time division multiplex form. As a result, all the subscriber units receive downstream data from the access point on the same carrier frequency, albeit over different channels. That is, the downstream channels $h_{1-1}$, $h_{1-2}$ to $h_{1-N}$ will have different channel impulse responses but will continuously receive the transmissions from the access point even if they are not specifically addressed to that subscriber unit. The access point 501 will receive transmissions from the subscriber units over upstream channels $h_{2-1}$, $h_{2-2}$ to $h_{2-N}$. Each of these channels will have a different channel impulse response and the transmissions will be time division multiplexed so that the access point receives bursts of data from each of the subscriber units in turn. Due to the different carrier frequencies used for upstream and downstream transmission, the downstream channel impulse responses $h_{1-1}$ to $h_{1-N}$ are not the same as the corresponding upstream channel responses $h_{2-1}$ to $h_{2-N}$.

Data sent by the access point is not precoded as all the subscriber units have sufficient time to equalise the channel characteristics between the access point and the respective subscriber unit, since they will normally receive all transmissions from the access point and the access point is transmitting relatively continuously. Thus each subscriber unit will include an equalizer to remove intersymbol interference from the transmissions of the access point and this equalizer has ample time to be trained to the channel characteristics. In the upstream direction, transmissions from the subscriber unit are precoded before being transmitted to compensate for the impulse response of the channel between the subscriber unit and the access point. This is because the access point would otherwise incur a substantial signal processing burden in equalising the channels from all the different subscriber units. This signal processing would have to be done in a short time period otherwise the transmission overheads would become excessive.

Figure 3:
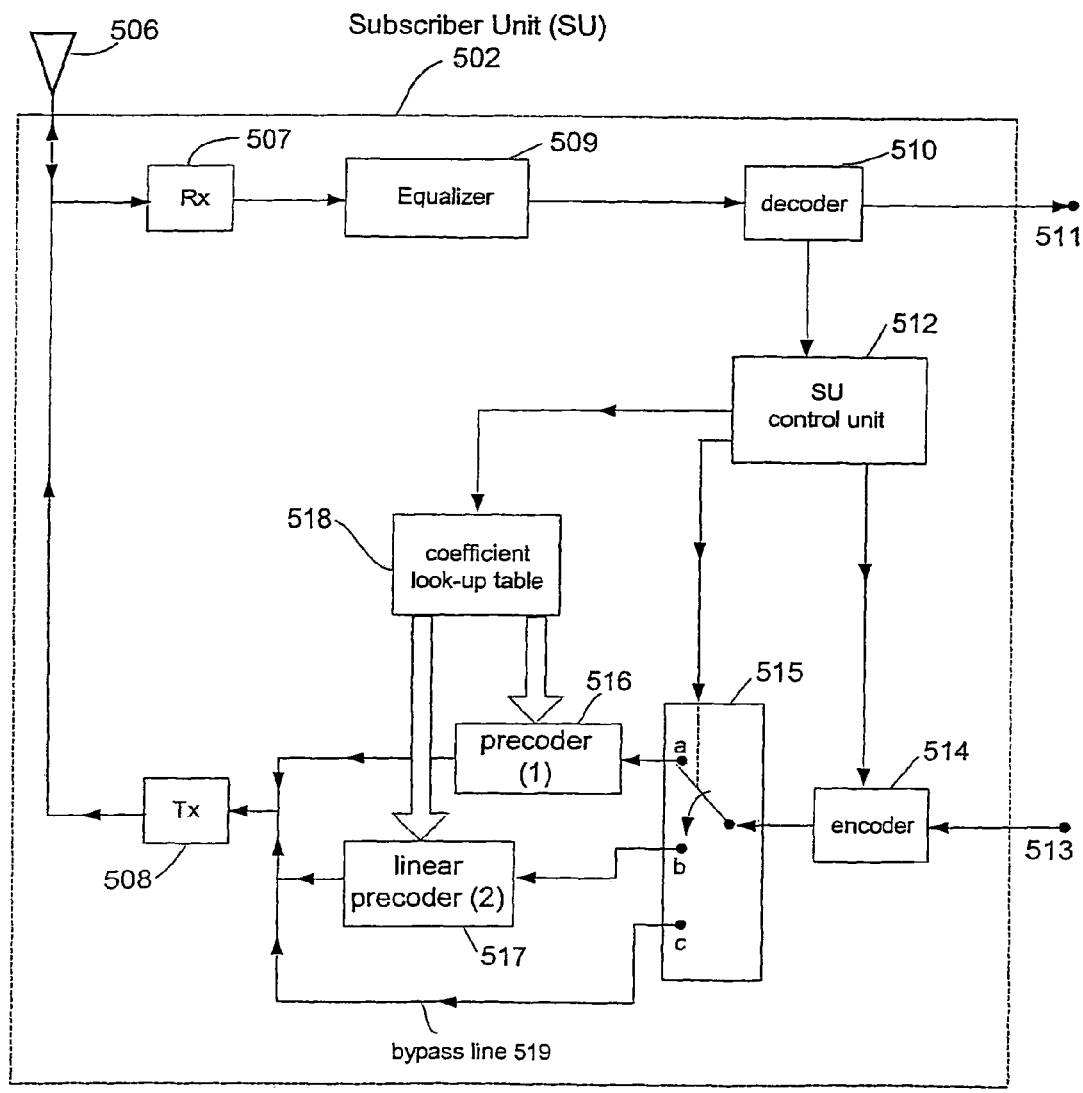
FIG. 3 shows in block schematic form a first embodiment of a subscriber unit according to the invention for use in the system of FIG. 2.

FIG. 3 shows in block schematic form an embodiment of a subscriber unit according to the invention. As shown in FIG. 3 the subscriber unit comprises an antenna 506 which is connected to the input of a receiver 507 and the output of a transmitter 508. The output of the receiver is fed to the input of an equaliser 509 whose output is connected to the input of a decoder 510. The output of the decoder 510 provides a data output 511 of the subscriber unit. The output of the decoder is also fed to an input of a control unit 512 which controls the operation of the subscriber unit. The control unit will typically comprise a processor with associated memory. A data input 513 is connected to the input of an encoder 514 which encodes the data to be transmitted and assembles it into appropriate data frames. The output of the encoder is fed via a switch 515 to the input of one of two precoders 516 and 517 or to a bypass line 519. The switch 515 is controlled by an output of the control unit 512 to cause the output of the encoder to be connected to one or other of the precoders 516 and 517 or to a bypass line 519. The outputs of the precoders 516 and 517 are connected to the input of the transmitter 508 to enable the data to be transmitted via the antenna 506 to the access point 501. A look up table 518 in the form of a random access memory is used to store the tap co-efficients of the precoders 516 and 517 and an output from the control unit 512 controls the loading of the tap co-efficients into the precoders 516 and 517. In some embodiments the precoders 516 and 517 and bypass line 518 may be a single FIR filter whose tap coefficients are loaded so that different coefficients are used depending on whether the contention word or more general data is being transmitted. In this case the switch 515 will be omitted.

The subscriber unit 502 is arranged to transmit a test contention word without preceding and in order to do this the switch 515 is set to position c so that the encoded data is applied to the transmitter 508 via the bypass line 519 and no preceding of the encoded contention word takes place. The test contention word is used in the access point to train an equaliser which has the same form as the linear precoder 517 in the subscriber unit. When the equaliser tap coefficients have been determined to enable the equaliser to equalise the channel impulse response specifically for the test contention word these tap coefficients are transmitted to the subscriber unit and placed in the look up table 518.

When the subscriber unit 502 subsequently transmits a normal contention word the switch 515 is set to position b and the encoded contention word is fed from the encoder 514 to the transmitter 508 via the linear precoder 517 which is optimised specifically for precoding the contention word and not for preceding general data. The coefficients of the linear precoder 517 are loaded from the look up table 518 under the control of the control unit 512 whenever the contention word is to be transmitted. They have been placed in the look up table 518 as a result of receiving them from the access point. A linear equaliser in the access point, which takes the same form as the precoder 517, is trained using the test contention word transmitted without precoding and its tap coefficients determined. These tap coefficients are received by the subscriber unit and placed in the look up table 518 for use in preceding subsequent transmissions of the contention word.

When the subscriber unit transmits general data the switch 515 is set to position a and the encoded general data is fed from the encoder 514 to the transmitter 508 via the precoder 516 which has its coefficients set for preceding arbitrary data sequences. These coefficients are also stored in the look up table 518 and are applied to the precoder 516 under the control of the control unit 512 whenever general data sequences are to be transmitted.

Figure 14:
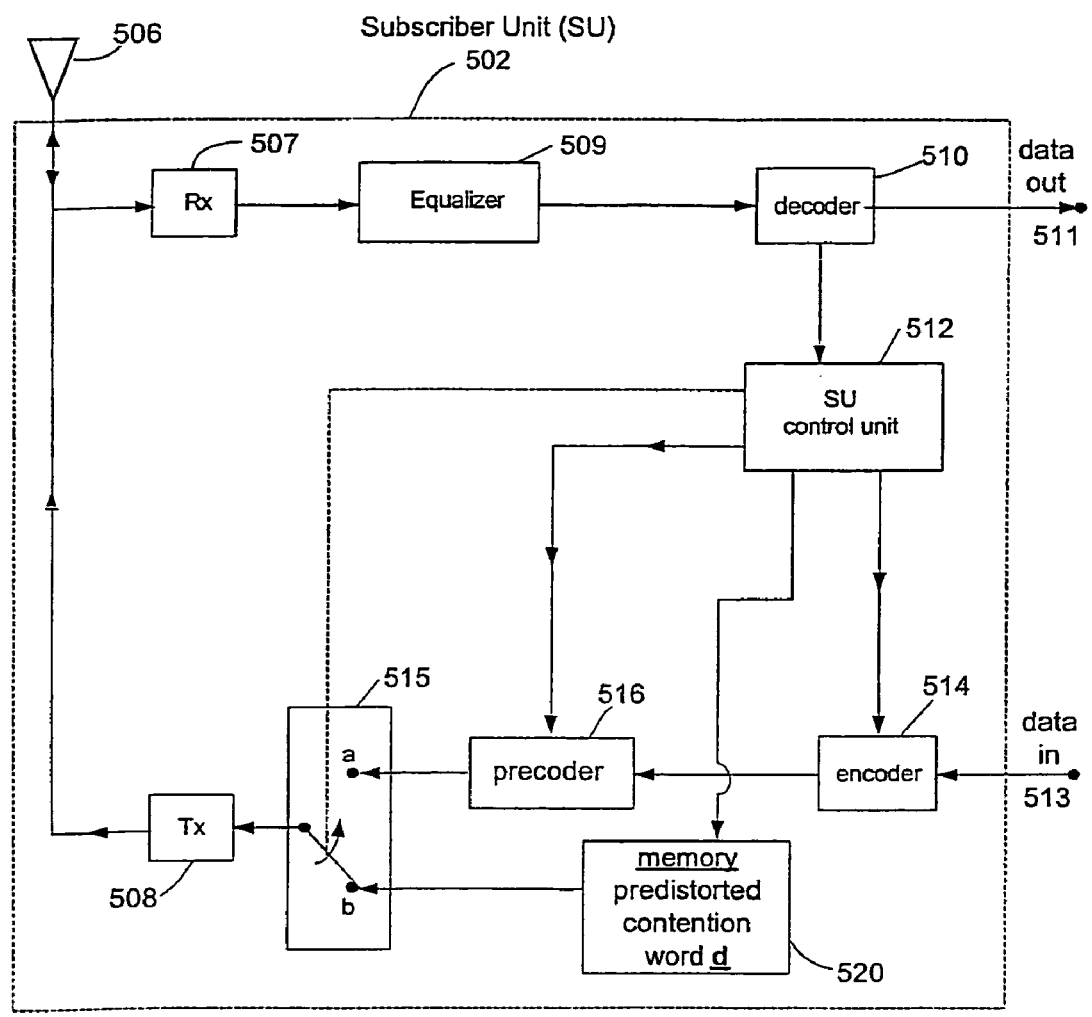
FIG. 14 shows in block schematic form a second embodiment of a subscriber unit according to the invention for use in the system of FIG. 2.

FIG. 14 shows in block schematic form a second (alternative) embodiment of subscriber unit in which the invention may be implemented. In FIG. 14 elements corresponding to elements in the embodiment of FIG. 3 have been given the same reference signs. Only the difference between the two embodiments will be described in detail in the following description.

The most significant difference between the two embodiments is that in the first embodiments the contention word c (see FIG. 10) is applied to a linear precoder 517 and the precoded contention word d (FIG. 10) is then applied to the transmitter 508 for transmission to the access point. In the second embodiment a memory 520 is provided instead of the linear precoder 517. In order to enter the precoded contention word into the memory the original contention word is convolved with the tap coefficients in a linear FIR filter or linear precoder once only and the resultant precoded contention word is written into the memory 520. Whenever it is desired to transmit the contention word it is read from the memory 520 and applied to the transmitter 508. The control unit 512 calculates the precoded contention word d and stores it in the memory 520. When the contention word c is to be transmitted in a contention slot the control unit 512 causes the predistorted contention word d to be read out of the memory 520 and fed to the transmitter 508 for transmission to the access point.

The set up procedure for the contention word follows the same process regardless of which embodiment is used. It is convenient in the second embodiment shown in FIG. 14 to place the switching arrangement immediately before the switch to select one of the sources 516, 519 and 520 of the data to be transmitted since the encoder 514 is not now the source of all the data to be transmitted.

In other respects the subscriber unit of the second embodiment may, conveniently, be the same as that of the first embodiment.

Figure 4:
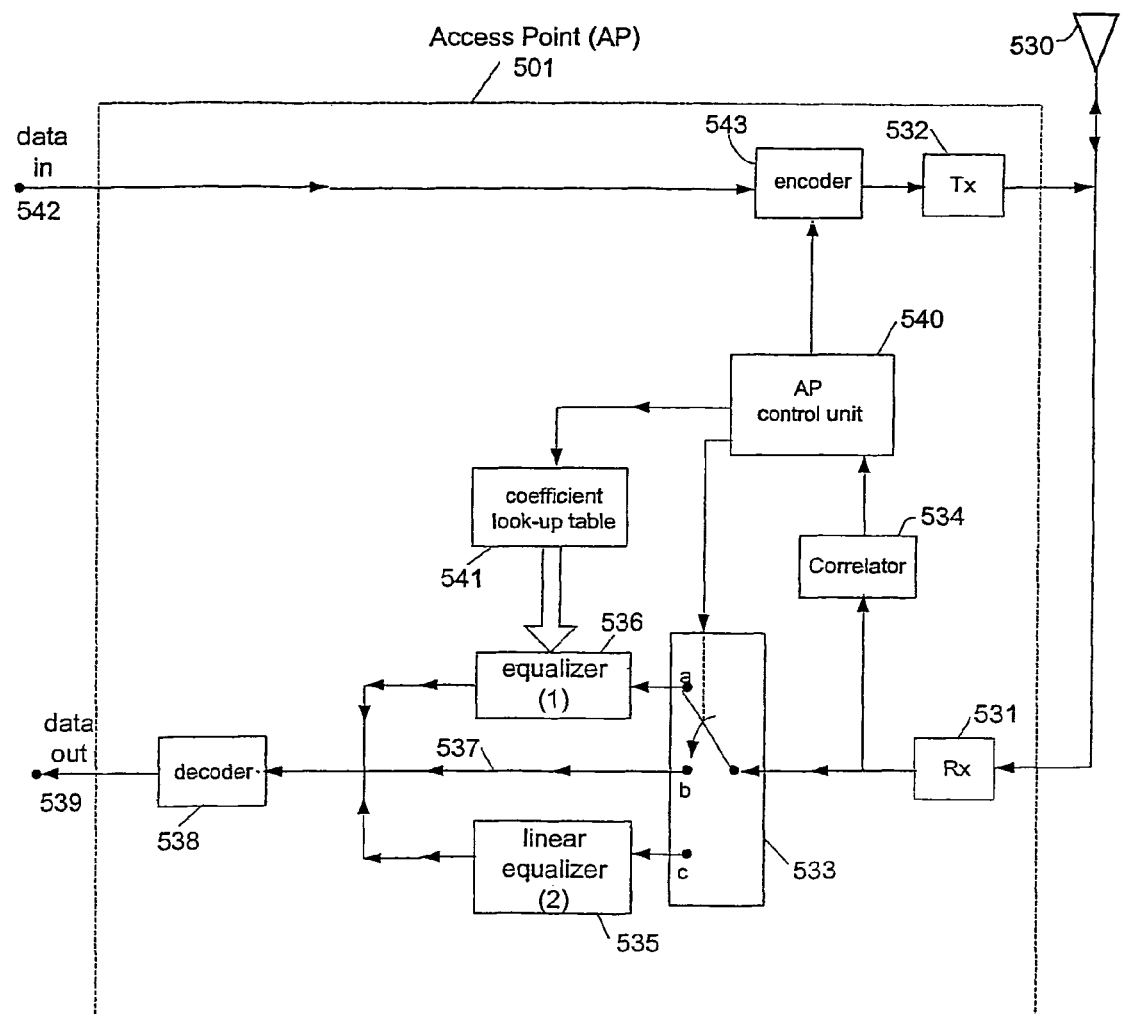
FIG. 4 shows in block schematic form an embodiment of an access point according to the invention for use in the system of FIG. 2.

FIG. 4 shows in block schematic form an embodiment of an access point 501 in which the invention may be implemented. The access point 501 comprises an antenna 530 which is connected to the input of a receiver 531 and the output of a transmitter 532. The output of the receiver 531 is connected via a switch 533 to respective inputs of a linear equaliser 535, an equalizer 536, which may take the form of a decision feedback equaliser, and a bypass line 537. The output of the receiver 531 is further connected to an input of a correlator 534 that establishes correct timing and provides timing information to a control unit 540. The outputs of the linear equalizer 535, equalizer 536, and bypass line 537 are connected to the input of a decoder 538. The output of the decoder 538 is fed to a data output 539 and to an input of the control unit 540. The control unit 540 has output which controls the switch 533 to select whether the bypass line 537, linear equalizer 535 or equalizer 536 are used in the decoding of the data sent from the subscriber units. The control unit 540 also enters data into a look up table 541, which may take the form of a read-write memory, and controls the reading out of the data into the equalizer 536 to enable the appropriate equalizer taps to be set up depending on which subscriber unit is transmitting to the access point at the time. The output of the linear equaliser 535 is additionally connected to an input of the control unit 540. A further read-write memory 545 is connected to the control unit 540 and to the linear equaliser 535. An input 542 receives data for transmission and is connected to the input of an encoder 543 whose output is fed to the transmitter 532. The encoder is controlled by an output from the control unit 540 which causes the data to be encoded and assembled into the appropriate frame structure.

When a test contention word is received during a reserved test contention time slot the switch 533 is set to position c and the control unit 540 runs the algorithm to train the linear equaliser 535 to the specific data sequence represented by the test contention word. Once the linear equaliser coefficients have been optimised they are read from the memory 545 by the control unit 540 and then applied to the encoder 543 for transmission to the subscriber unit that transmitted the test contention word in the reserved time slot.

When a normal contention word is received during a general contention slot the switch 533 is set to position b so that the received contention word is passed via the bypass line 537 to the decoder 538 as the contention word will have been precoded by the subscriber unit so that it arrives at the access point undistorted and can be directly decoded.

When general data is received the access point will know which subscriber unit has transmitted the general data as the access point allocates the time slots during which each subscriber unit can transmit. Consequently it also knows the channel impulse response of the channel over which the data is being transmitted. At this time the switch 533 is set to position a and the equaliser 536 is used to equalise the received data before applying it to the decoder 538. The coefficients for the equaliser 536 are stored in the look up table 541 and the appropriate set is loaded into the equaliser 536 under the control of the control unit 540.

As a result of this procedure the processing load in the access point is minimised as it only has to calculate the coefficients of the linear equaliser once for each subscriber unit which is registered with the access point when the subscriber unit first registers. Subsequent transmissions of the contention word are precoded so that no equalisation is required and no prior knowledge of which subscriber unit is transmitting the contention word is needed.

Figure 5:
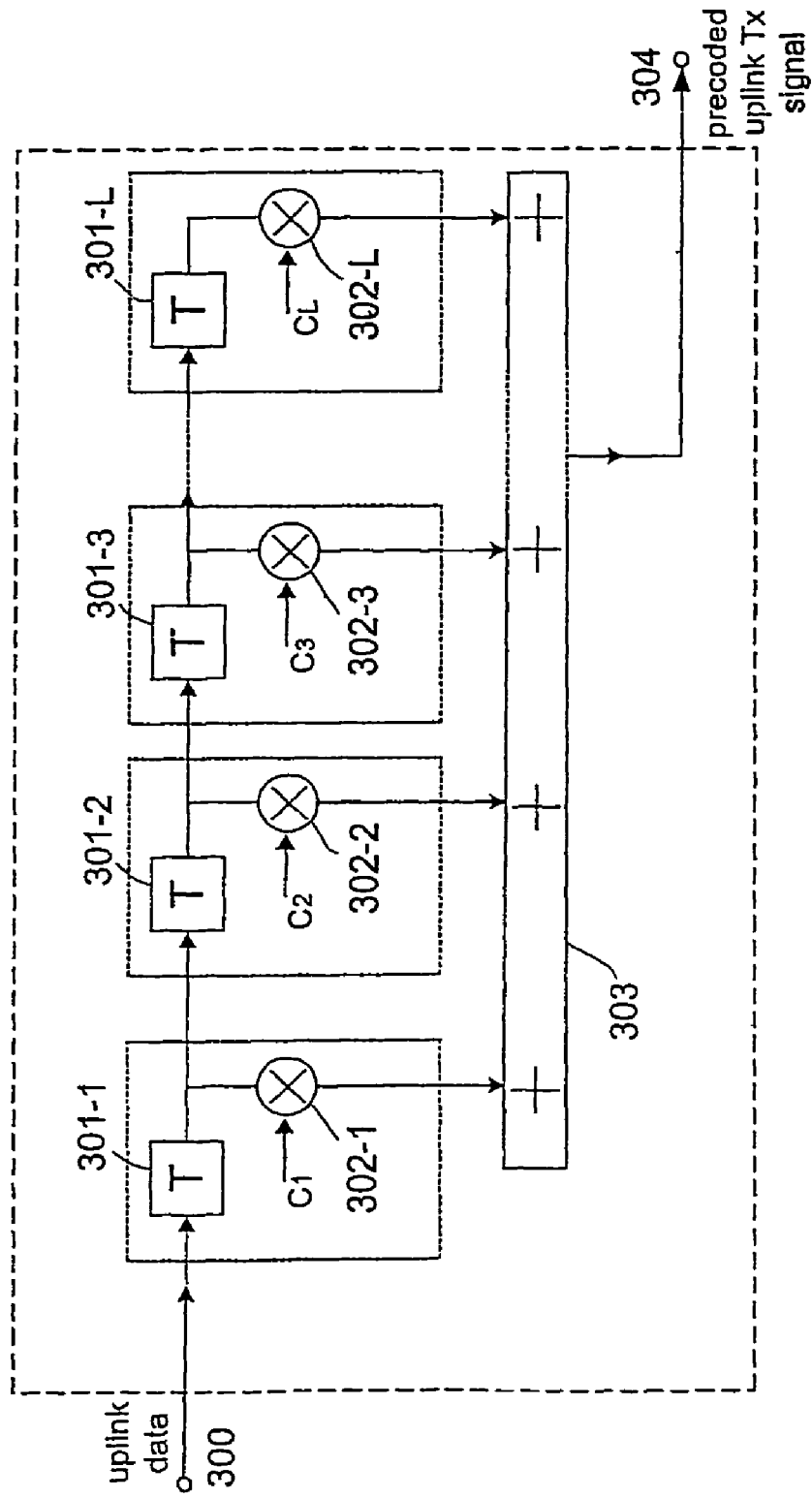
FIG. 5 shows in block schematic form a linear precoder which may be used in a system according to the invention.

FIG. 5 shows in block schematic form a finite impulse response (FIR) filter which may be used as the linear equaliser 535 in the access point 501 (FIG. 4) and as the linear precoder 517 in a subscriber unit 502 (FIG. 3).

The FIR filter has an input 300 which is connected to the input of the first of L series connected delay stages 301-1, 301-2 to 301-L. The output of each delay stage is connected to the first input of a respective multiplier 302-1, 302-2 to 302-L. Tap coefficient inputs C1, C2 to CL are connected to second inputs of the multipliers 302-1, 302-2 to 302-L. The outputs of the multipliers 302-1, 302-2 to 302-L are fed to respective inputs of a summing arrangement 303 whose output is coupled to the output 304 of the filter.

When used as the equaliser 535 in the access point the input 300 receives the output signal from the receiver 531, that is the data sequence transmitted by the subscriber unit without precoding, and the output 304 is coupled to the decoder 538. The tap coefficients C1 to CL are adjusted using the chosen algorithm and updated at each iteration until the equaliser is optimised for the predetermined data sequence. The predetermined data sequence in the case of a fixed wireless access system is a contention word which the subscriber unit transmits in order to be allocated a time slot for transmission of general data.

When used as the linear precoder 517 in a subscriber unit the input 300 receives the predetermined data sequence (for example a contention word) from the encoder 514 and predistorts it using the filter characteristics to produce a predistorted data sequence at the output 304 which is fed to the transmitter 508. The filter tap coefficients are loaded from the look up table 518 and are the same as those determined in the access point 501 for the equaliser 535. By this means the predistortion generated by the linear precoder 517 will be the inverse of that introduced by the transmission channel and consequently the data will arrive at the access point substantially undistorted and not require equalisation before detection and decoding.

Figure 6:
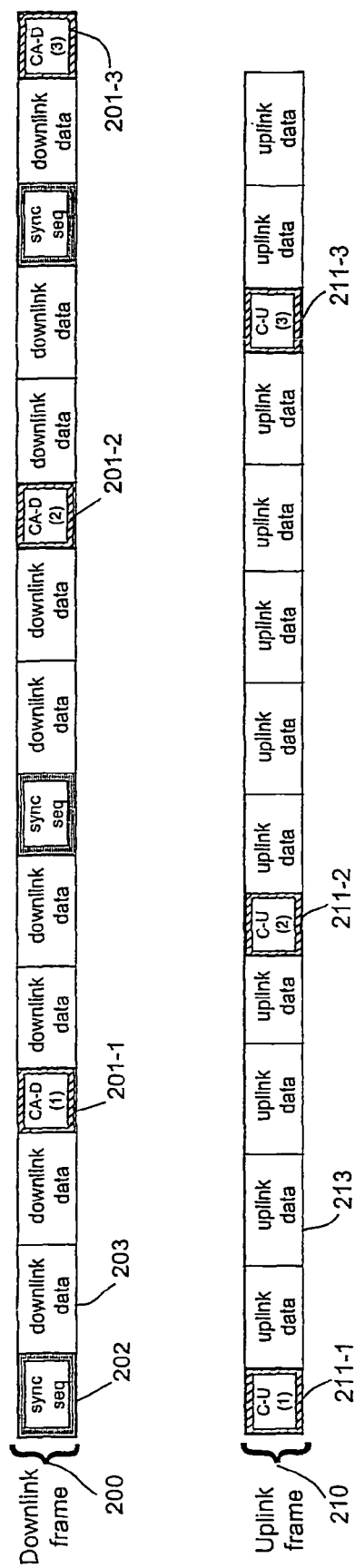
FIG. 6 shows upstream and downstream frames and shows in particular the contention word slots.
Figure 7:
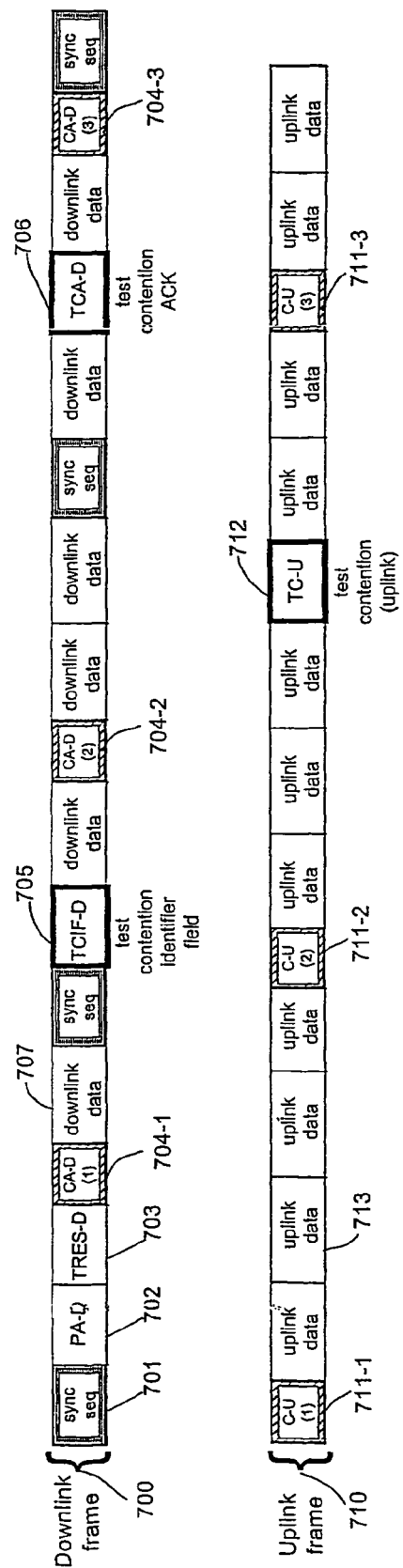
FIG. 7 shows details of upstream and downstream frames indicating the method of setting up the contention word.
Figure 8:
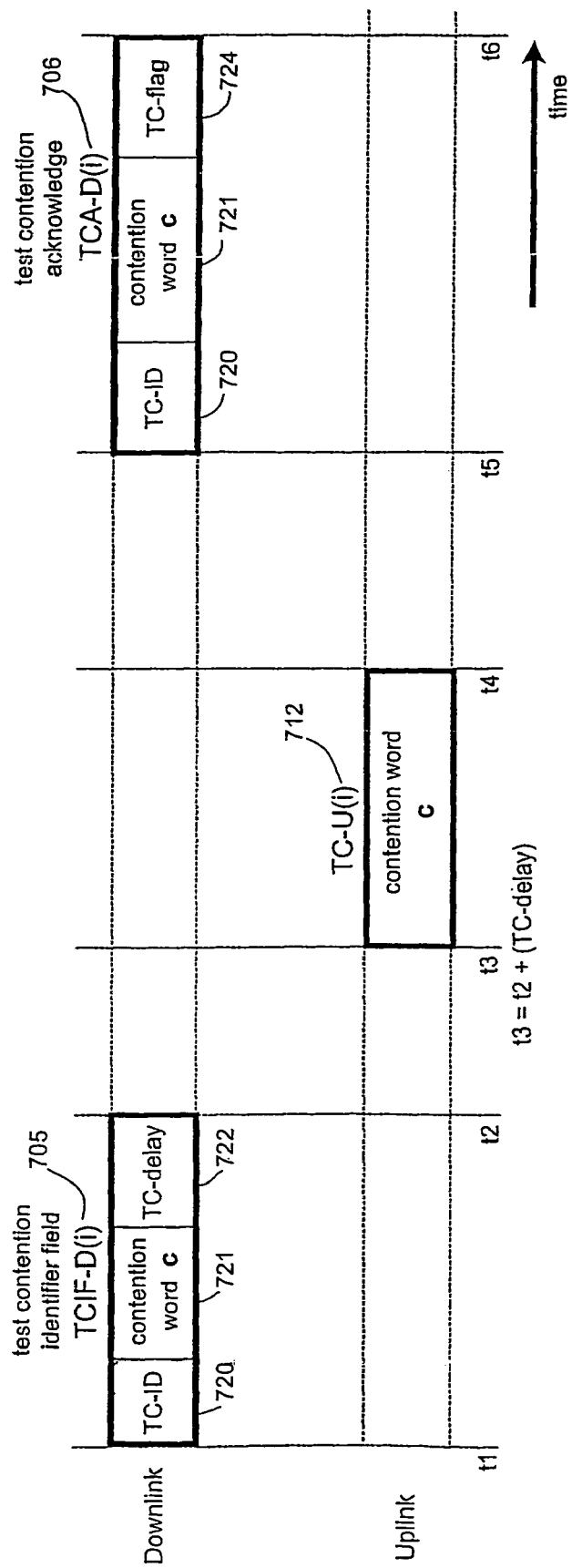
FIG. 8 illustrates upstream and downstream frames showing the contention word set up fields in expanded form.

Frame structures for use in transmitting data between the access point and the subscriber units in both directions are shown in FIGS. 6, 7 and 8. As shown in FIG. 6, the downstream frame 200 comprises a synchronisation sequence 202 and downstream data fields 203. Contention allocation data fields 201-1 to 201-3 are also transmitted which identify to individual subscriber units when they are allocated data slots to transmit data to the access point over the upstream channels. The upstream frames 210 include contention slots 211-1 to 211-3 during which a subscriber unit can send a contention word to ask the access point for transmission time. The upstream data fields 213 contain the data sent by the subscriber units to the access point. These are the commonly transmitted frames which cater for the sending of data in both directions and for the subscriber units to obtain allocated transmission time slots.

FIG. 7 shows further upstream and downstream frames which contain fields allowing the subscriber units and access point to set up the data channels between them by a process which will be described in greater detail with reference to FIG. 9. These frames will be transmitted periodically interleaved with the normal data transmission frames. The downstream frame 700 comprises a synchronising sequence 701 followed by a power adjustment field 702 and a precoder initialisation field 703. Our co-pending UK patent applications nos. 0113887.4 (42557) and 0113888.2 (43066) disclose how those fields are used to set the power level at which the subscriber unit transmits data to the access point and to determine the tap coefficients for the precoder 516 used for general data transmission. The present invention is concerned, inter alia, with the initial set up of the contention word precoder 517. The power adjustment and precoder initialisation fields are followed by a contention allocation field CA-D 704-1 and downstream data fields 707. A test contention request field (TCR-D) 705 is transmitted which, as shown in FIG. 8 comprises a subscriber unit identifier (SU-ID) 720, a control code (TCR control code) 721 signifying that the TCR-D field is a test contention request, the contention word to be used 722 and a test contention delay (TC-delay) 723 which specifies a dedicated time slot (TC-U) 712 in which the subscriber unit should send a test contention word 722 without preceding. The access point listens during the dedicated time slot TC-U 712 for the test contention word 722 transmitted by the subscriber unit and trains the linear equaliser 535 to equalise the unique test contention word used. When the equaliser 535 has been trained the tap coefficients are transmitted to the subscriber unit in a test contention acknowledgment field (TCA-D) 706. The test contention acknowledgment field 706 comprises the subscriber unit identity (SU-ID) 720, the linear tap coefficients 725 that were obtained after training the linear equaliser 535 using the contention word transmitted without preceding and which are to be used by the precoder 517 for future transmission of the contention word in the contention slots 711-1, 711-2, 711-3 etc, and a flag TC-flag 726 which is high when the access point has successfully decoded the test contention word in the time slot (TC-U) 712.

Figure 9:
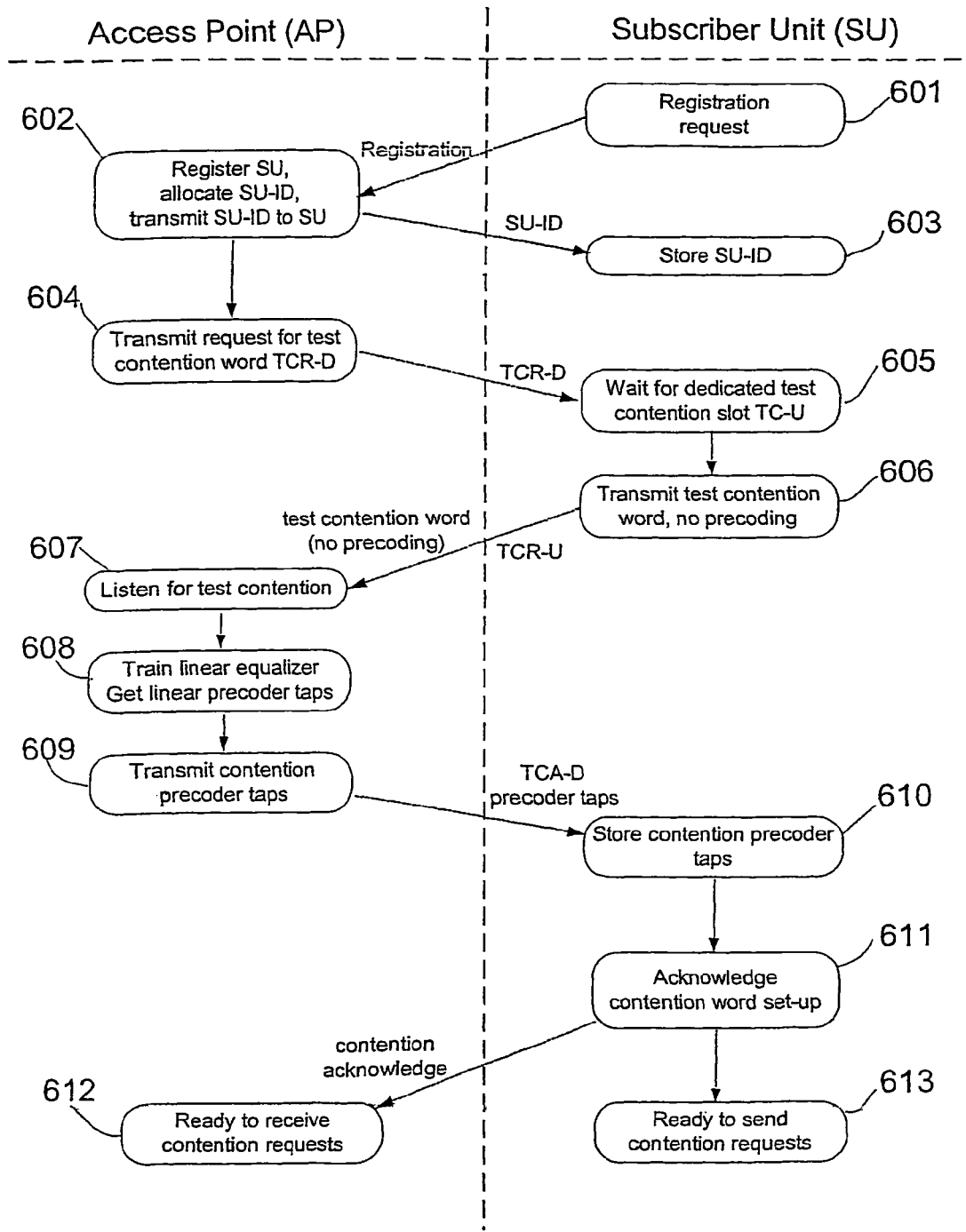
FIG. 9 is a flow diagram illustrating the setting up of the subscriber unit contention word.

The method of setting up the subscriber unit contention word is illustrated in FIG. 9. The process starts in step 601, with the subscriber unit transmitting a registration request. This informs the access point that the subscriber unit is active and wishes to register with that access point. On receiving a registration request the access point goes through a registration procedure, step 602, which allocates and transmits a unique code SU-ID to the subscriber unit which receives and stores this code in step 603. The access point then performs step 604 which consists of generating and transmitting a request for a test contention word. This request takes the form of field TCR-D 705 in FIGS. 7 and 8. The subscriber unit then receives and decodes the TCR-D field 5 705 and, if the SU-ID corresponds with that stored in step 603, it waits for the arrival of the dedicated test contention slot TC-U 712, step 605, and then, in step 606, transmits the test contention word 722 with no preceding. The access point then, in step 607, listens for the transmitted test contention word during the TC-U time slot 712 and, in step 608, trains the linear equaliser 535 to determine the equaliser tap coefficients. These correspond to the required tap coefficients for the linear precoder 517 in the subscriber unit so the next step, 609, is to transmit the precoder tap coefficients to the subscriber unit. This is done using the test contention acknowledge TCA-D field 706. The subscriber unit then receives the field TCA-D 706 and decodes and stores the precoder tap coefficients, step 610. The subscriber unit then, in step 611, sends an acknowledgment to the access point that it has received the tap coefficients and, in step 612, the access point readies itself to receive contention requests from the subscriber unit. That is, in the embodiment shown in FIG. 4 it will set switch 533 to position b during contention slots. Similarly the subscriber unit then readies itself, step 613, to send normal contention requests which are passed through the linear precoder 517 to predistort the contention word before transmission so that the access point can decode it without having to equalise it. This is achieved in the embodiment shown in FIG. 3 by setting the switch 515 to position b when a contention word is to be transmitted.

As in UK Patent Application No: 0106604.2 (42559) a linear precoder is used to avoid the stability problems associated with non-linear precoders. In the present invention however, the precoder transfer function F is not adjusted to be the inverse of the channel transfer function H. Instead the precoder transfer function F is optimised for an individual data sequence so that the particular data sequence arrives undistorted at the receiver. Thus, for a particular data sequence $X_1$ a unique precoder is calculated with transfer function $F_1$. Transfer function $F_1$ is calculated to ensure that when the unique sequence $X_1$ is passed through the precoder and the transmission channel it will arrive at the receiver undistorted. A particular encoder $F_N$ can only be used to precode the unique data sequence $X_N$ which corresponds to it. This relaxes the constraints on the precoder transfer function F, so that the unique transfer function $F_N$ is more easily realisable with a linear finite impulse response filter. Any other data sequence precoded using these tap coefficients will not normally be decodable on reception.

In order to set up the precoder for a particular data sequence $X_N$, a test signal consisting of the sequence $X_N$ is transmitted over the channel without any preceding as illustrated in steps 604 to 607 of FIG. 9. The length of the sequence $X_N$ is L symbols. The linear equaliser 535 at the receiver in the access point is then trained using an adaptive algorithm which trains the equaliser specifically for the sequence $X_N$. After training is complete the tap coefficients of the linear equaliser are transmitted back to the subscriber unit and stored in a look up table at a location corresponding to the particular sequence $X_N$ for later use as precoder coefficients. The linear equaliser 535 at the access point is not further used and is now deactivated because a subsequent data burst from the transmitter in the subscriber unit will be precoded. Whenever the subscriber unit wishes to transmit the sequence $X_N$ it accesses the look up table 518, retrieves the tap coefficients corresponding to the sequence $X_N$, and loads these coefficient values into the taps of the linear precoder 517. The data sequence $X_N$ is then passed through the linear precoder 517 and transmitted over the channel arriving undistorted at the receiver. In a typical embodiment each subscriber unit will use a single unique contention word and, consequently, will only require a single set of tap coefficients for the linear precoder 517. In this case the look up table 518 may not be required.

In one embodiment of the invention, the length of the precoder is set to be equal to the length of the data sequence L. The linear equaliser at the access point also has length L. The linear equaliser 535 at the access point is then trained using an adaptive algorithm constrained in such a way that the equaliser compensates channel distortion only for the unique training sequence used. An example of a suitable adaptive algorithm is a modified version of the recursive least squares (RLS) algorithm with the number of iterations limited to L. It is well known to use the RLS algorithm to calculate the tap co-efficients for an equaliser but in the known arrangement the RLS algorithm has always operated with substantially more iterations than the length of the sequence L in order to make the equaliser taps independent of the training sequence, since it has been desired to cause the equaliser to equalise all data sequences. According to an embodiment of the present invention, the number of iterations used by the RLS algorithm is intentionally limited to be not substantially more than L symbols with the express intention of making the equaliser taps converge to a set of values which are optimised only for the unique training sequence used, which is in practice the contention word.

As known in the art, see for example "Digital Communications" by J. G. Proakis published by McGraw-Hill 1995, the RLS algorithm uses least squares to solve the set of linear equations:

$$R_k F_k = D_k \quad (1)$$

where:

$R_k$ is the signal correlation matrix defined as:

$$R_k = \sum_{n=0}^{k} w^{k-n} Y_n^* Y_n^T \quad (2)$$

$Y_k$ is the vector of received signal samples
$F_k$ is the vector of equalisation taps
$D_k$ is the cross correlation vector defined as:

$$D_k = \sum_{n=0}^{k} w^{k-n} X(n) Y_n^* \quad (3)$$

$X(k)$ is the transmitted symbol of time interval k
w is a weighting factor 0<w<1
The solution is given as:

$$F_k = R_k^{-1} D_k \quad (4)$$

$$P_k = R_k^{-1} \quad (5)$$

The RLS algorithm minimises the cost function $\epsilon(n)$:

$$\varepsilon(n) = \sum_{i=l}^{n} \lambda^{n-i} |e(i)|^2 \quad (6)$$

where e(k) is the error between the desired symbol and the estimated symbol at the slicer input, at time k. The RLS algorithm computes the solution to equation (4) iteratively, using the following procedure.

1. Compute output:

$$z(k) = Y_k^T F_{k-1} \quad (7)$$

2. Compute error:

$$e(k) = x(k) - z(k) \quad (8)$$

3. Compute Kalman gain vector:

$$K_k = \frac{P_{k-1} Y_k^*}{w + Y_k^T P_{k-1} Y_k^*} \quad (9)$$

4. Update inverse of correlation matrix:

$$P_k = \frac{1}{w}[P_{k-1} - K_k Y_k^T P_{k-1}] \quad (10)$$

5. Update equalizer coefficients:

$$F_k = F_{k-1} + K_k e(k) = F_{k-1} + P_k Y_k^* e(k) \quad (11)$$

The steps 1-5 above are repeated for a number of iterations, until the equalizer coefficients converge. In order to avoid stability problems due to an ill-conditioned correlation matrix; it is known in the art to initialize the matrix $P_k$ to $P_0 = \delta I$ where I is the identity matrix, and $\delta$ is a small positive number. The value $\delta$ must be chosen so that $\delta << 0.01 \sigma_x^2$ where $\sigma_x^2$ is the variance of the data samples. For the case of QPSK signals, for example, $\sigma_x^2 = 1$ and so $\delta$ should be chosen as $\delta \leq 0.001$. For large training sequence lengths relative to the equalizer length, the exact value of $\delta$ does not have a significant effect, provided $\delta << 0.01 \sigma_x^2$. This is known as soft-constrained initialisation.

The effect of the initialisation $P_0 = \delta I$ soon disappears as the number of iterations is substantially greater than the length of the equalizer, and the forgetting factor W causes exponential weighting of past data. This causes the equalizer taps to converge to a solution providing channel equalization independent-of the input data sequences. Thus it is seen that in the case of soft-constrained initialisation, the initialisation merely ensures smooth start-up of the algorithm, but does not substantially influence the final result.

Figure 11:
FIG. 11 shows the form of the contention word.

One embodiment of the present invention uses a modified version of the RLS algorithm to calculate equalizer tap values for channel equalization that are specifically optimised for a given data sequence. This method uses hard-constrained initialisation of the RLS algorithm, so that the initialisation state of the correlation matrix has a substantial effect on the final equalizer tap values. The inverse correlation matrix is initialized to $P_0 = \delta I$ where $\delta$ is chosen to have an unusually high value, that is greater than 0.2 and preferably in the range $0.5 \leq \delta \leq 1.2$, with a particularly preferred value of $\delta = 1$, assuming $\sigma_x^2 = 1$. The graph shown in FIG. 11 illustrates that to reduce the mean square error (MSE) to a low value, the value of $\delta$ should be higher than 0.2. The graph shown in FIG. 12 illustrates that if the value of $\delta$ is smaller than 0.05, then the modified RLS algorithm fails to converge in a large proportion of channels. Therefore, to achieve good performance, the range of $\delta$ should be restricted to $0.2 \leq \delta \leq 1.2$, normalised to $\sigma_x^2 = 1$. The number of iterations is restricted to be not substantially greater than and preferably to be less than or equal to the length of the equalizer, which is unusually low. This may be contrasted with the normal use of the RLS algorithm to set equalizer co-efficients for any data sequence where the number of iterations is chosen to be much greater than the length of the equalizer. The forgetting factor W is set to a high value of 1, so that the effect of the autocorrelation matrix initialisation does not decay rapidly with time and, consequently, has a large influence on the final tap coefficient values.

These parameters result in a novel operating mode of the RLS algorithm. Instead of the effect of $P_0 = \delta I$ disappearing, the small number of iterations and high values of $\delta$ and w ensure that $P_0$ has a very significant effect on the final values of the equalizer coefficients. As a result tap coefficients are produced which are optimised for the data sequence $X_n$, but not for any other sequence.

Using this new initialisation procedure requires a change in the RLS cost function. Instead of minimizing the cost function $\epsilon(n)$ as in equation (6) above, the algorithm now minimises the modified cost function $\epsilon_M(n)$:

$$\varepsilon_M(n) = \delta \lambda^n \|F_n\|^2 + \sum_{i=1}^{n} \lambda^{n-i} |e(i)|^2$$

with $\delta = 1$ and $\lambda = 1$, so that $$\varepsilon_M(n) = \|F_n\|^2 + \sum_{i=1}^{n} |e(i)|^2 \quad (12)$$

where $\|F_n\|^2$ is the squared norm of $F_n$ calculated as $$\|F_n\|^2 = \sum_{j=1}^{L} |f_{jn}|^2, \text{ and } F_n = [f_{1n}, f_{2n}, \ldots, f_{Ln}]$$

Minimisation of the cost function $\epsilon_M(n)$ with the number of iterations restricted to be less than or equal to the number of equalizer taps, results in an equalizer which is optimised for the particular data sequence used during training.

The modified RLS algorithm described here has the additional advantage of very low complexity due to the reduced number of iterations. The only significant disadvantage of this mode of operation is that the statistical noise rejection properties of the RLS algorithm are reduced because of the reduced number of iterations. This is in contrast to the conventional operating mode of the RLS algorithm, whereby the equalizer taps are trained to be independent of the input data sequence, and the number of iterations needed to train the equalizer is substantially higher. In the conventional mode of operation, the RLS algorithm has very good noise rejection.

An alternative embodiment of the invention would be to use an optimisation algorithm using a gradient search method (for example the method of steepest descent) to adapt the linear equalizer at the receiver and so produce coefficients for the precoder which are optimized for the unique data sequence X. This optimization algorithm, however, requires substantially more iterations than the modified RLS algorithm described previously herein.

Figure 10:
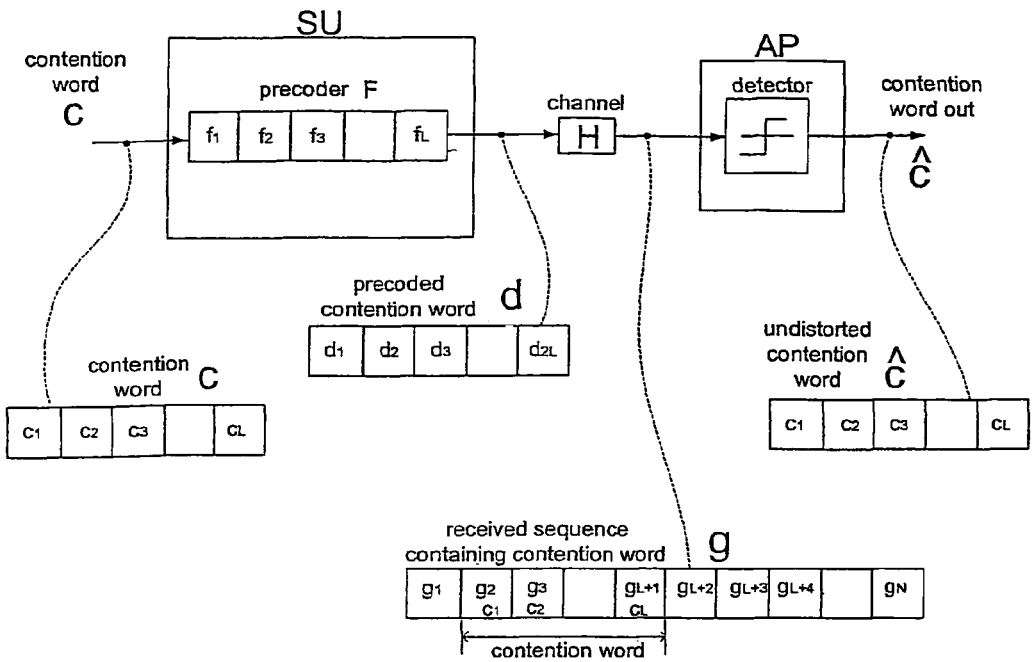
FIG. 10 is a block schematic diagram of a subscriber unit and access point illustrating the setting up of the contention word.

The preceding procedure for the contention word is illustrated in FIG. 10, where the contention word c, is the unique data sequence $X_n$. The contention word, c, (of length L) is passed through the precoder F (of length L), to produce a precoded contention word, d (of length 2L). The precoded contention word is then transmitted through the channel, H (of length hlen), and arrives at the receiver as a sequence g, (of length N=2L+hlen) which contains an undistorted copy of the contention word c. The contention word c is illustrated in FIG. 11 and consists of a first part which is a known synchronisation sequence, and a second part consisting of the SU-ID and a third part which is the cyclic redundancy check (CRC). The AP uses the correlator 534 to synchronise with the position of the first part (sync sequence) of the contention word in the received sequence g. This allows the AP to extract the whole contention word c from g. The detector at the AP decodes the SU-ID contained in the second part of the contention word, c, and verifies it using the CRC. Since the contention word c is undistorted on reception at the AP, the correlator at the AP operates at a very high signal-to-noise ratio (SNR), providing accurate synchronization which would not be possible without precoding. The detector used to decode the contention word at the AP may be a simple symbol detector (for example, an amplitude level detector), which is possible because the contention word is undistorted. Thus the delay in decoding the contention word is very low, resulting in high efficiency.

The optimized precoding scheme as disclosed herein is ideally suited to the contention process in a wireless network, where each subscriber unit wishes to transmit a short, unique sequence during the contention slot. Typically, each SU only needs to transmit a single, fixed sequence for contention (rather than a number of arbitrary data sequences), which makes it possible to optimize the precoder specifically for this sequence. An advantage of the invention is that the contention word can generally be sufficiently precoded before transmission using a short precoder to enable detection at the access point without using equalisation. A further advantage of the invention is that a linear precoder is used, so avoiding the stability problems associated with non-linear precoders. A further advantage of the invention is that the length of the precoder is minimised, which prevents excessive smearing of the received contention word in time, so minimizing transmission overhead. A further advantage of the invention is that the process for determining the precoder tap coefficients requires only a small number of iterations of the RLS algorithm, thus computational complexity and processing time are low.

The invention claimed is:

1. A method of pre-distorting a predetermined data sequence to compensate for the impulse response of a channel over which the predetermined data sequence is to be transmitted comprising the steps of;

transmitting the predetermined data sequence without precoding over the channel using a first transmitter, receiving the predetermined data sequence using a first receiver and equalising the received signal, using an algorithm that is constrained to optimise the equaliser specifically for the predetermined sequence, to enable the data sequence to be decoded;

determining the equaliser coefficients required to enable the equaliser to equalise the received data sequence, applying the determined equaliser coefficients to a second transmitter;

transmitting the equaliser coefficients to a second receiver using the second transmitter, receiving the equaliser coefficients at the second receiver, and loading the received equaliser coefficients into a precoder in the first transmitter when the predetermined sequence is subsequently transmitted so that it is received at the first receiver in a form suitable for decoding without equalisation at the first receiver.

2. The method as claimed in claim 1 in which the algorithm is the recursive least square algorithm.

3. The method as claimed in claim 2 in which the initial state of the correlation matrix $P_0$ is set to $P_0 = \delta I$, where $\delta > 0.1\sigma^2$ and $\sigma^2$ is the variance of the data samples, and where I is the identity matrix.

4. The method as claimed in claim 2 in which the number of iterations is restricted to be not substantially greater than the length of the equaliser.

5. The method as claimed in claim 4 in which the first receiver and second transmitter are located in the access point and the second receiver and first transmitter are located in a subscriber unit wherein in order to set up the precoder to precode the contention word the following steps are implemented;

the access point is arranged to transmit a data field comprising a subscriber unit identifier, a test contention request control code, a contention word to be returned by the subscriber unit, and a test contention delay which indicates a reserved time slot during which the subscriber unit should transmit the test contention word, the subscriber unit is arranged to receive and decode the transmitted data field and to transmit the received contention word without precoding to the access point in the reserved time slot, the access point is arranged to receive the contention word, to train a linear equaliser using the received contention word, and to determine the equaliser tap coefficients, the access point is arranged to transmit to the subscriber unit a data field comprising the subscriber unit identifier, the determined equaliser tap coefficients, and a flag indicating that the test contention word has been successfully decoded, and the subscriber unit is arranged to calculate and store a predistorted version of the contention word for subsequent transmission of the contention word to the access point.

6. The method as claimed in claim 1 in which the length of the equaliser is equal to the length of the predetermined data sequence.

7. The method as claimed in claim 1 for use in a fixed wireless access (FWA) communications system comprising an access point and a plurality of subscriber units each transmitting a predetermined data sequence; in which each subscriber unit comprises a precoder for predistorting the predetermined data sequence to compensate for the characteristics of the upstream transmission channel between the subscriber unit and the access point wherein the system comprises means for optimising the precoder characteristic specifically for the predetermined data sequence in which the predetermined sequence is a contention word.

8. The method as claimed in claim 7 in which the first receiver and second transmitter are located in the access point and the second receiver and first transmitter are located in a subscriber unit wherein in order to get up the precoder to precode the contention word the following steps are implemented;

the access point is arranged to transmit a data field comprising a subscriber unit identifier, a test contention request control code, a contention word to be returned by the subscriber unit, and a test contention delay which indicates a reserved time slot during which the subscriber unit should transmit the test contention word, the subscriber unit is arranged to receive and decode the transmitted data field and to transmit the received contention word without precoding to the access point in the reserved time slot, the access point is arranged to receive the contention word, to train a linear equaliser using the received contention word, and to determine the equaliser tap coefficients, the access point is arranged to transmit to the subscriber unit a data field comprising the subscriber unit identifier, the determined equaliser tap coefficients, and a flag indicating that the test contention word has been successfully decoded, and the subscriber unit is arranged to load the received tap coefficients into a linear precoder to predistort the contention word on subsequent transmission of the contention word to the access point.

9. A method of pre-distorting a predetermined data sequence to compensate for the impulse response of a channel over which the predetermined data sequence is to be transmitted comprising the steps of;

transmitting the predetermined data sequence without precoding over the channel using a first transmitter, receiving the predetermined data sequence using a first receiver and equalising the received signal, using an algorithm that is constrained to optimise the equaliser specifically for the predetermined sequence, to enable the data sequence to be decoded;

determining the equaliser coefficients required to enable the equaliser to equalise the received data sequence, applying the determined equaliser coefficients to a second transmitter;

transmitting the equaliser coefficients to a second receiver using the second transmitter, receiving the equaliser coefficients at the second receiver;

forming the predistorted predetermined data sequence and storing it in memory; and subsequently transmitting the stored predistorted predetermined data sequence so that it is received at the first receiver in a form suitable for decoding without equalisation at the first receiver.

10. A fixed wireless access (FWA) communications system for pre-distorting a predetermined data sequence to compensate for an impulse response of a channel over which the predetermined data sequence is to be transmitted, the system comprising:

a plurality of subscriber units, each subscriber unit comprising a transmitter to transmit data transmissions including a predetermined data sequence without precoding over the channel; and an access point comprising:
  a receiver to receive the data transmissions including the predetermined data sequence from at least one of the subscriber units,
  an equalizer to:
    equalize the received predetermined data sequence, using an algorithm that is constrained to optimize the equalizer of the access point specifically for the received predetermined data sequence, to enable the received predetermined data sequence to be decoded, and
    determine equalizer coefficients used by the equalizer of the access point to equalize the received data sequence, and
  a transmitter to transmit data transmissions including the determined equalizer coefficients to the at least one of the subscriber units,
  wherein each subscriber further comprises:
    a receiver to receive the data transmissions from the access point including the determined equalizer coefficients,
    a precoder, and
    a control unit to load the received equalizer coefficients into the precoder so as to allow the transmitter at the corresponding subscriber unit to subsequently transmit the predetermined sequence in a form suitable for decoding without equalization at the receiver of the access point.

11. The system as claimed in claim 10, wherein the precoder in each subscriber unit is configured for predistorting the predetermined data sequence to compensate for characteristics of an upstream transmission channel between the corresponding subscriber unit and the access point, and wherein the system comprises means for optimising a precoder characteristic specifically for the predetermined data sequence.

12. The system as claimed in claim 11 in which the predetermined data sequence is a contention word.

13. The system as claimed in claim 11 in which the precoder is optimised using a recursive least squares algorithm.

14. The system as claimed in claim 13 wherein an initial state of a signal correlation matrix $P_0$ is set to $P_0 = \delta I$, where $\delta > 0.1 \sigma^2$ and $\sigma^2$ is a variance of data samples, and where I is an identity matrix.

15. The system as claimed in claim 13 in which a number of iterations is restricted to be not greater than a length of the precoder.

16. The system as claimed in claim 11 in which a frequency division duplex, time division multiplex protocol is used for communication between the access point and the subscriber units.

17. The system as claimed in claim 11, wherein the precoder is a linear finite impulse response filter.

18. The system as claimed in claim 17 in which a length of the precoder is equal to a length of the predetermined data sequence.

19. The system as claimed in claim 10, wherein the equalizer of the access point comprises a linear equaliser for equalising a predetermined data sequence received over a transmission channel, wherein the linear equaliser is optimised specifically to equalise the predetermined data sequence.

20. The system as claimed in claim 19 in which the equaliser is a linear finite impulse response filter.

21. The system as claimed in claim 19 in which the predetermined data sequence is a contention word.

22. The system as claimed in claim 19 in which the equaliser is optimised using the recursive least squares algorithm.

23. The system as claimed in claim 22 wherein an initial state of a signal correlation matrix $P_0$ is set to $P_0 = \delta I$, where $\delta > 0.1 \sigma^2$ and $\sigma^2$ represents variance of data samples, and where I is an identity matrix.

24. The system as claimed in claim 23 in which a number of iterations is restricted to be not greater than a length of the equaliser.

25. The system as claimed in claim 19 in which a length of the equaliser is equal to a length of the predetermined data sequence.

26. The system as claimed in claim 19, wherein the access point comprises:
  a control unit for implementing an algorithm used to train the equaliser and determining the equaliser tap coefficients; and
  wherein the transmitter is configured for transmitting the determined equaliser tap coefficients to the particular subscriber unit that transmitted the predetermined data sequence to the access point.

27. The system as claimed in claim 19 in which the predetermined data sequence is a contention word, and wherein the access point comprises:
  a processor arranged to allocate a contention word to be transmitted by a subscriber unit, to cause the allocated contention word to be transmitted to a selected subscriber unit together with an instruction to the subscriber unit to transmit the allocated contention word without predistortion at a given time, and to train the equaliser using the received contention word at the given time.

28. The system as claimed in claim 10, wherein the precoder of the subscriber unit comprises a precoder solely for predistorting the predetermined data sequence to compensate for the impulse response of the transmission channel, wherein the precoder is optimised specifically to predistort the predetermined data sequence, and wherein the precoder comprises a memory to store the received equalizer coefficients.

29. The system as claimed in claim 28, wherein each subscriber unit comprises:
  a decoder for decoding the received data transmissions,
  wherein the control unit is configured for interpreting the data transmissions from the access point and controlling a response thereto of the subscriber unit, and
  wherein the control unit is arranged to cause the subscriber unit to transmit a received contention word to the access point in response to an instruction received from the access point without precoding at a time specified by the access point and to apply precoding to the contention word on transmissions of the contention word subsequent to receiving precoder tap coefficients from the access point.

30. A fixed wireless access (FWA) communications system for pre-distorting a predetermined data sequence to compensate for an impulse response of a channel over which the predetermined data sequence is to be transmitted, the system comprising:
  a plurality of subscriber units, each subscriber unit comprising a transmitter to transmit data transmissions including a predetermined data sequence without precoding over the channel; and
  an access point comprising:
    a receiver to receive the data transmissions including the predetermined data sequence from at least one of the subscriber units,
    an equalizer to:
      equalize the received predetermined data sequence, using an algorithm that is constrained to optimize the equalizer of the access point specifically for the received predetermined data sequence, to enable the received predetermined data sequence to be decoded, determine equalizer coefficients used by the equalizer to equalize the received data sequence, and a transmitter to transmit data transmission including the determined equalizer coefficients, wherein each subscriber unit further comprises:

a receiver to receive the data transmission from the access point including the determined equalizer coefficients, and a control unit to form predistorted predetermined data sequence and store the predistorted predetermined data, wherein the transmitter of the corresponding subscriber unit is configured to transmit the stored predistorted predetermined data sequence in a form suitable for decoding without equalization at the access point.

31. The system as claimed in claim 30, wherein each subscriber unit comprises a memory in which the predistorted version of the predetermined data sequence is stored.

32. A fixed wireless access (FWA) communications system comprising an access point and a plurality of subscriber units each transmitting a predetermined data sequence; in which each subscriber unit comprises a precoder solely for predistorting the predetermined data sequence to compensate for characteristics of an upstream transmission channel between the corresponding subscriber unit and the access point, and in which the precoder is optimised using the recursive least squares algorithm, and wherein the system comprises means for optimising a precoder characteristic specifically for the predetermined data sequence, and wherein the precoder of each subscriber unit comprises a memory in which a predistorted version of the predetermined data sequence is stored, and wherein an initial state of a signal correlation matrix $P_0$ is set to $P_0=\delta I$, where $\delta>0.1\sigma^2$ and $\sigma^2$ is the variance of the data samples, and where I is the identity matrix.

* * * * *

UNITED STATES PATENT AND TRADEMARK OFFICE
CERTIFICATE OF CORRECTION

| | | |
|---|---|---|
| PATENT NO. | : 7,787,531 B2 | Page 1 of 1 |
| APPLICATION NO. | : 10/484557 | |
| DATED | : August 31, 2010 | |
| INVENTOR(S) | : John David Porter, Malcolm Paul Sellars and Stephen David Greaves | |

It is certified that error appears in the above-identified patent and that said Letters Patent is hereby corrected as shown below:

Cover Page, Abstract, column 2, line 3, after "502-2" insert -- , --.

Column 21, Claim 30, line 15, delete "predistored" and insert -- predistorted --, therefor.

Signed and Sealed this
Eighteenth Day of January, 2011

David J. Kappos
*Director of the United States Patent and Trademark Office*